(12) United States Patent
Tart et al.

(10) Patent No.: US 8,503,190 B2
(45) Date of Patent: Aug. 6, 2013

(54) MONITORING SYSTEMS AND BACKPLANE FOR A MONITORING SYSTEM

(75) Inventors: Michael Alan Tart, Gardnerville, NV (US); Sean Kelly Summers, Carson City, NV (US); Bryan James Shadel, Gardnerville, NV (US); Mitchell Dean Cohen, Carson City, NV (US); Lysle Rollan Turnbeaugh, Carson City, NV (US); Steven Thomas Clemens, Carson City, NV (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 12/782,029

(22) Filed: May 18, 2010

(65) Prior Publication Data

US 2011/0286186 A1     Nov. 24, 2011

(51) Int. Cl.
    *H01R 12/16*         (2006.01)

(52) U.S. Cl.
    USPC ............ 361/788; 361/796; 361/798; 361/803

(58) Field of Classification Search
    USPC .................. 361/788, 796–803; 710/300–310
    See application file for complete search history.

(56) References Cited

U.S. PATENT DOCUMENTS

| | | | |
|---|---|---|---|
| 4,872,212 A * | 10/1989 | Roos et al. ................... | 361/818 |
| 6,330,525 B1 | 12/2001 | Hays et al. | |
| 6,405,139 B1 | 6/2002 | Kicinski et al. | |
| 6,421,571 B1 | 7/2002 | Spriggs et al. | |
| 6,662,118 B2 | 12/2003 | Carle et al. | |
| 6,671,633 B2 | 12/2003 | Kramb et al. | |
| 7,102,893 B1 * | 9/2006 | MacArthur et al. .......... | 361/788 |
| 7,136,290 B1 * | 11/2006 | Wise .............................. | 361/788 |
| 7,593,784 B2 | 9/2009 | Carle et al. | |
| 2004/0218855 A1 * | 11/2004 | Markwardt et al. ............ | 385/24 |
| 2007/0168499 A1 * | 7/2007 | Chu .............................. | 709/224 |
| 2008/0097718 A1 | 4/2008 | Nelson | |
| 2008/0186194 A1 | 8/2008 | Kaminski et al. | |

\* cited by examiner

*Primary Examiner* — Tuan T Dinh
(74) *Attorney, Agent, or Firm* — Fletcher Yoder, P.C.

(57) ABSTRACT

A first backplane for being electrically coupled to a second backplane, a system monitoring module, and at least one transducer monitoring module includes a system interface bus configured to be coupled to the system monitoring module and the second backplane. The intermediate backplane also includes at least one monitor interface bus configured to be coupled to the at least one transducer monitoring module and the second backplane and an intermediate backplane bus configured to be coupled to the at least one transducer monitoring module and the system monitoring module.

15 Claims, 2 Drawing Sheets

MONITORING SYSTEMS AND BACKPLANE FOR A MONITORING SYSTEM

BACKGROUND OF THE INVENTION

The present application relates generally to monitoring systems and, more particularly, to a backplane for use with a monitoring system.

Known machines may exhibit vibrations or other abnormal behavior during operation. One or more sensors may be used to measure such behavior and to determine, for example, an amount of vibration exhibited in a motor drive shaft, a rotational speed of the motor drive shaft, and/or other suitable operational characteristics of a machine or motor. Often, the sensors are coupled to a monitoring system that includes a plurality of monitors. Each monitor receives signals representative of measurements from one or more sensors, performs at least one processing step on the signals, and then transmits the modified signals to a diagnostic platform that displays the measurements to a user.

At least some known legacy monitoring systems include at least one low-speed electrical bus within a backplane that is commonly used to couple to one or more legacy low-speed monitors. However, such monitoring systems may not have a backplane infrastructure that provides sufficient bandwidth to be able to couple to newer higher-speed monitors that use high-speed electrical busses. As such, at least some monitoring systems must either be replaced entirely or be limited to only being used with low speed monitors.

BRIEF DESCRIPTION OF THE INVENTION

In one embodiment, a first backplane for being electrically coupled to a second backplane, a system monitoring module, and at least one transducer monitoring module is provided. The first backplane includes a system interface bus configured to be coupled to the system monitoring module and the second backplane, at least one monitor interface bus configured to be coupled to the at least one transducer monitoring module and the second backplane, and an intermediate backplane bus configured to be coupled to the at least one transducer monitoring module and the system monitoring module.

In another embodiment, a monitoring system is provided that includes at least one transducer configured to monitor an operating condition of at least one machine, and a first backplane configured to be coupled to the at least one transducer. The monitoring system also includes a second backplane configured to be coupled to the first backplane and at least one transducer monitoring module configured to be coupled to the second backplane. The at least one transducer monitoring module is further configured to process at least one signal received from the at least one transducer.

In another embodiment, a monitoring system is provided that includes a first backplane and a second backplane configured to be coupled to the first backplane. The second backplane includes a system interface bus configured to be coupled to a system monitoring module and the first backplane, at least one monitor interface bus configured to be coupled to at least one transducer monitoring module and the first backplane, and an intermediate backplane bus configured to be coupled to the at least one transducer monitoring module and the system monitoring module. The monitoring system also includes at least one interface board configured to be coupled to the intermediate backplane and the first backplane.

DETAILED DESCRIPTION OF THE INVENTION

Figure 1:
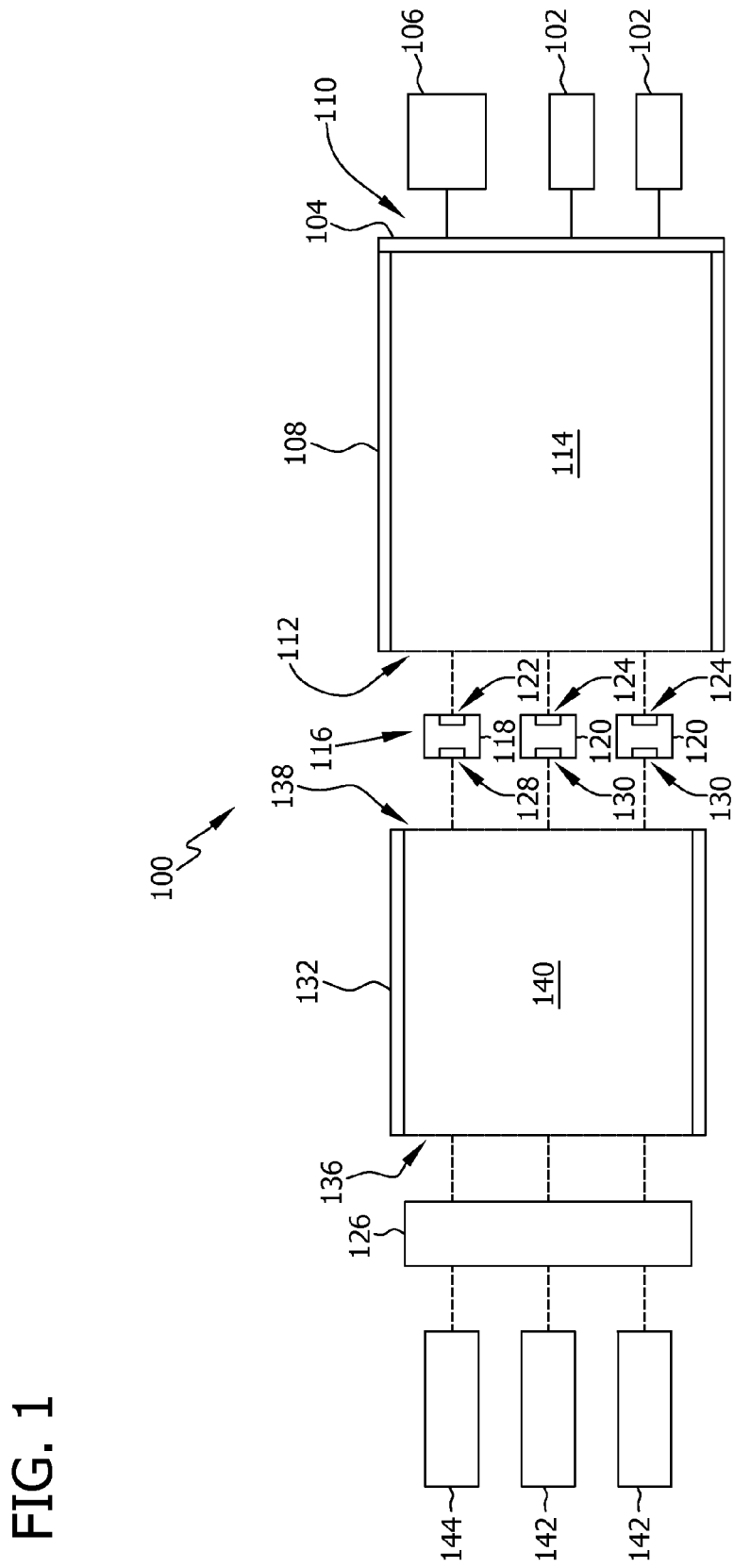
FIG. 1 is a side cross-sectional view of an exemplary monitoring system that may be used to monitor a machine.

FIG. 1 is a side cross-section view of an exemplary monitoring system 100 that may be used to monitor a machine (not shown). In the exemplary embodiment, monitoring system 100 monitors, detects, and/or measures one or more operating conditions of one or more machines (not shown) using one or more transducers 102 or other sensors. More specifically, in the exemplary embodiment, transducers 102 are coupled to a system backplane 104 that receives signals from transducers 102. The signals are indicative of measured operating conditions of the machine and/or one or more components of the machine. Moreover, in the exemplary embodiment, monitoring system 100 receives power from a power supply 106 that is coupled to system backplane 104. Alternatively, monitoring system 100 may receive power from any suitable power source that enables system 100 to function as described herein. Moreover, in the exemplary embodiment, system backplane 104 includes a monitoring system bus (not shown in FIG. 1) that includes a plurality of conductors (not shown). As used herein, the term "couple" is not limited to a direct mechanical and/or electrical connection between components, but may also include an indirect mechanical and/or electrical connection between components.

System backplane 104 is positioned within a main housing 108. In the exemplary embodiment, system backplane 104 is positioned towards or adjacent to a rear portion 110 of main housing 108, such that a front portion 112 of main housing 108 is substantially unoccupied. Main housing 108 defines a main cavity 114 that is in flow communication with front portion 112.

Monitoring system 100 includes a plurality of interface boards 116 coupled to system backplane 104. In the exemplary embodiment, interface boards 116 couple to system backplane 104 through front portion 112. Alternatively, interface boards 116 may couple to system backplane 104 at any relative suitable location within monitoring system 100. In the exemplary embodiment, interface boards 116 include a system interface board 118 and at least one monitor interface board 120. While two monitor interface boards 120 are shown in FIG. 1, this is merely exemplary and is not intended to limit the invention in any manner.

System interface board 118 is coupled to system backplane 104 with a system interface input connector 122. Moreover, in the exemplary embodiment, monitor interface board 120 is coupled to system backplane 104 with a monitor interface input connector 124.

Monitoring system 100 includes an intermediate backplane 126 that electrically couples to system backplane 104. In the exemplary embodiment, intermediate backplane 126 couples to system backplane 104 through interface boards 116. More specifically, intermediate backplane 126 couples directly to interface boards 116, and interface boards 116 couple directly to system backplane 104.

In the exemplary embodiment, intermediate backplane 126 is coupled to an electromagnetically shielded intermediate housing 132. Intermediate housing 132 facilitates reducing the electromagnetic radiation generated by intermediate backplane 126 and/or any suitable component within intermediate housing 132 from escaping into an external environment. Intermediate housing 132 includes a front opening 136 and a rear opening 138. An intermediate cavity 140 is defined within intermediate housing 132 and is in flow communication with front opening 136 and rear opening 138. In one embodiment, intermediate backplane 126 is coupled within intermediate cavity 140 adjacent to rear opening 138, and interface boards 116 extend at least partially through rear opening 138, when coupled to intermediate backplane 126. Alternatively, intermediate backplane 126 and interface boards 116 may be positioned in any suitable location within intermediate housing 132 and/or main housing 108 that enables monitoring system 100 to function as described herein.

Monitoring system 100 includes at least two transducer monitoring modules 142 that process at least one signal from transducers 102. As used herein, the term "process" refers to performing an operation on, adjusting, filtering, buffering, and/or altering at least one characteristic of a signal. In the exemplary embodiment, monitoring system 100 includes any number of transducer monitoring modules 142 that enables system 100 to function as described herein. Transducer monitoring modules 142 are coupled to intermediate backplane 126 and are at least partially within intermediate housing 132. As such, in the exemplary embodiment, signals from transducers 102 are transmitted to transducer monitoring modules 142 through system backplane 104, interface boards 116, and intermediate backplane 126. Moreover, as described more fully herein, at least one signal is transmitted between the different transducer monitoring modules 142.

Monitoring system 100 also includes at least one system monitoring module 144 that is coupled to intermediate backplane 126 at least partially within intermediate housing 132. In the exemplary embodiment, system monitoring module 144 receives data and/or status signals transmitted from transducer monitoring modules 142 and/or from other components of monitoring system 100. System monitoring module 144 processes and/or analyzes the data and/or status signals and transmits the signals to a remote system (not shown), such as a computer system, for display or output to a user.

During assembly, system backplane 104 is coupled to housing rear portion 110. Interface boards 116 are then coupled to system backplane 104 using system interface input connector 122 and monitor interface input connectors 124. Intermediate backplane 126 is coupled within intermediate housing 132 adjacent to rear opening 138, and housing 132 is inserted through housing front portion 112 to enable intermediate backplane 126 to couple to interface boards 116. More specifically, intermediate backplane 126 is coupled to system interface output connector 128 and to monitor interface output connectors 130. Transducer monitoring modules 142 and system monitoring module 144 are inserted through housing front opening 136 and are coupled to intermediate backplane 126. In one embodiment, at least a portion of transducer monitoring modules 142 and/or system monitoring module 144 extends outward into the environment from housing front opening 136. In an alternative embodiment, any component of monitoring system 100 may be positioned in any suitable location that enables system 100 to operate as described herein. As such, in the exemplary embodiment, when monitoring system 100 is fully assembled, transducer monitoring modules 142, system monitoring module 144, system backplane 104, intermediate backplane 126, intermediate housing 132, and interface boards 116 are at least partially positioned within main housing 108.

Figure 2:
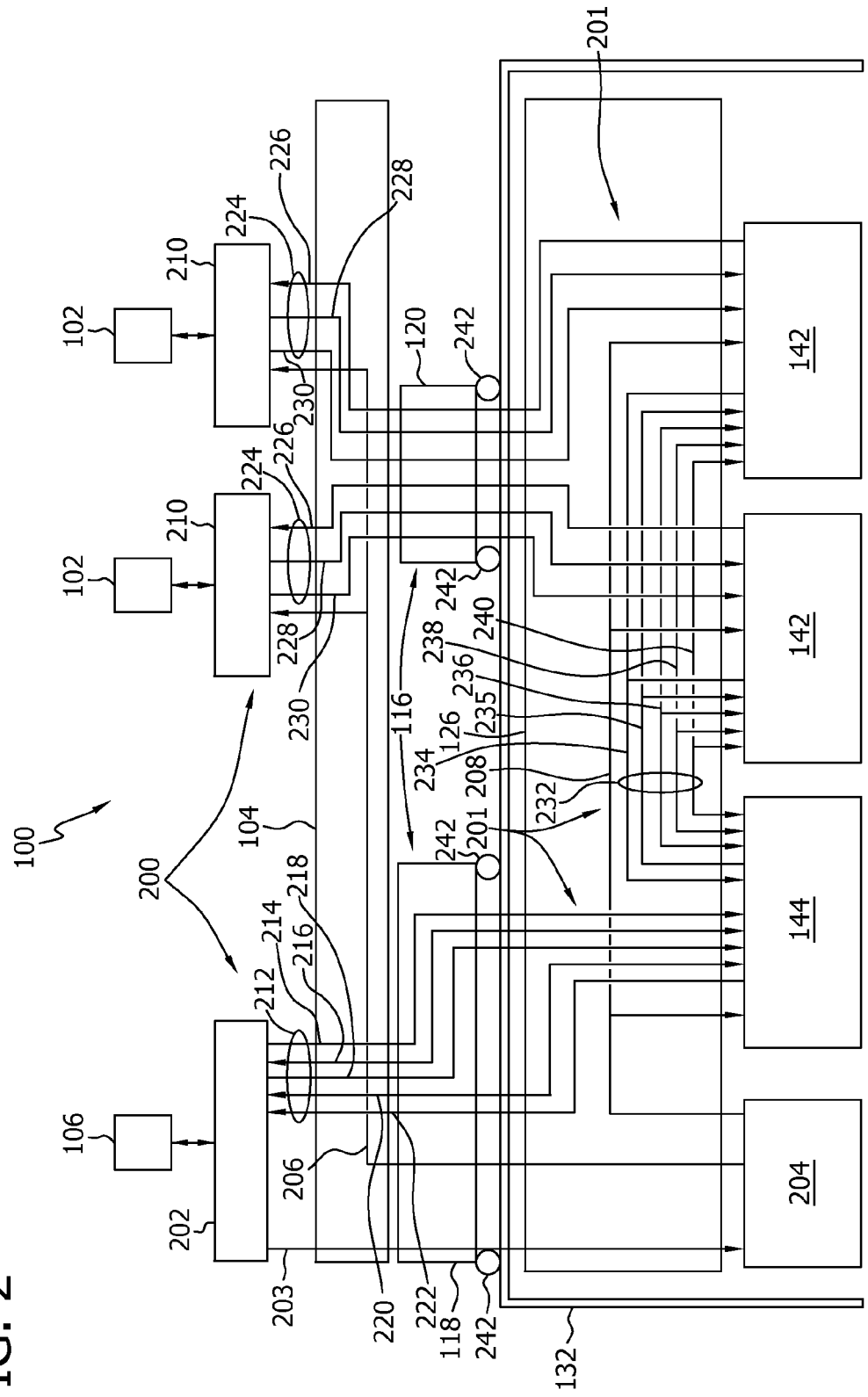
FIG. 2 is a block diagram of the monitoring system shown in FIG. 1.

FIG. 2 is an exemplary block diagram of monitoring system 100. As shown in FIG. 2, system backplane 104 includes a plurality of busses 200. In the exemplary embodiment, busses 200 are direct current (DC) and/or low-speed busses, i.e., the busses are designed to transmit and to receive DC and/or low-speed alternating current (AC) signals. As used herein, the term "low-speed" refers to AC signals that have frequencies of between about 0 hertz (Hz) to about 50 kilohertz (KHz).

In the exemplary embodiment, intermediate backplane 126 includes a plurality of busses 201. In the exemplary embodiment, busses 201 include at least one substantially DC bus (not shown), at least one low-speed bus (not shown), and at least one high-speed bus (not shown). As used herein, the term "high-speed" refers to AC signals having frequencies in ranges that are greater than the frequencies of the low-speed signals. For example, in one embodiment, high-speed signals have frequencies of about 100 KHz or higher. In the exemplary embodiment, at least one low-speed bus within intermediate backplane 126 transmits low-speed signals to system backplane 104, and at least one high-speed bus transmits high-speed signals to at least two transducer monitoring modules 142 and/or to system monitoring module 144.

In the exemplary embodiment, monitoring system 100 includes a power input module 202 that is coupled to and receives power from power supply 106. Power input module 202 routes the received power through a power input bus 203 that is coupled to and/or extends through system backplane 104, system interface board 118, and intermediate backplane 126 to a power supply module 204 coupled to intermediate backplane 126. Power supply module 204 routes the received power into a plurality of power rails (or voltage levels) that include at least a plurality of system backplane power rails and a plurality of intermediate backplane power rails. Power supply module 204 routes the system backplane power rails through a system backplane power bus 206 that is coupled to and/or extends through intermediate backplane 126 and system interface board 118 to system backplane 104. Power supply module 204 routes the intermediate backplane power rails through an intermediate backplane power bus 208 that extends through intermediate backplane 126. In the exemplary embodiment, the plurality of system backplane power rails include +5 volts (V), +7.5 V, −7.5 V, and a negative transducer voltage level. The plurality of intermediate backplane power rails include a positive low reference voltage level, a positive high reference voltage level, and a negative transducer voltage level. Alternatively, the system backplane power rails and/or the intermediate backplane power rails include any suitable voltage levels. Intermediate backplane power bus 208 provides power to transducer monitoring modules 142 and to system monitoring module 144.

In the exemplary embodiment, monitoring system 100 includes one or more signal input modules 210 that are coupled between transducers 102 (shown in FIG. 1) and system backplane 104. System backplane power bus 206 is coupled to, and provides power to, signal input modules 210. Moreover, in the exemplary embodiment, each transducer 102 is coupled to a separate signal input module 210, and each signal input module 210 is coupled to a separate transducer monitoring module 142.

System backplane 104, system interface board 118, intermediate backplane 126, and system monitoring module 144 include and/or are coupled to a system interface bus 212 that is substantially low-speed. System interface bus 212 transmits and receives monitoring and control signals to and from power supply 106 and system monitoring module 144. System interface bus 212 includes, for example, a machine speed reference bus 214 for use in transmitting speed reference signals, a serial communication bus 216 for use in transmitting serial data and/or control signals, a reset control bus 218 for use in transmitting control signals that may be used prevent or enable a resetting of a component, a network bus 220 for use in transmitting system data signals, and/or a control bus 222 for use in transmitting relay status and/or control signals. Alternatively, system interface bus 212 may include any number of and/or type of suitable low-speed bus or busses. System interface bus 212 is routed through system interface input connector 122 and system interface output connector 128 (both shown in FIG. 1).

System backplane 104, monitor interface boards 120, intermediate backplane 126, and transducer monitoring modules 142 also include and/or are coupled to a plurality of monitor interface busses 224 that are substantially low-speed. Monitor interface busses 224 transmit and receive monitoring and control signals to and from signal input modules 210 and transducer monitoring modules 142. Each monitor interface bus 224 includes, for example, a relay control bus 226 for use in transmitting relay control signals, a transducer signal bus 228 for use in transmitting transducer signals that are representative of at least one measured operating condition of a machine, and/or an alarm bus 230 for use in enabling and/or inhibiting an alarm from being generated. Alternatively, each monitor interface bus 224 may include any number of and/or type of suitable low-speed bus or busses. Moreover, in the exemplary embodiment, a separate monitor interface bus 224 is provided for each transducer monitoring module 142 and/or each signal input module 210 coupled to intermediate backplane 126 (i.e., system backplane 104, monitor interface boards 120, and intermediate backplane 126 each include a separate relay control bus 226, transducer signal bus 228, and/or alarm bus 230 for each signal input module 210 and/or transducer monitoring module 142). In one embodiment, each monitor interface board 120 routes monitor interface busses 224 from two signal input modules 210 to intermediate backplane 126. Intermediate backplane 126 routes the two monitor interface busses 224 to two separate transducer monitoring modules 142. In the exemplary embodiment, monitor interface busses 224 are routed through monitor interface input connector 124 and monitor interface output connector 130 (both shown in FIG. 1).

Intermediate backplane 126 includes an intermediate backplane bus 232, and at least one bus (not shown) within intermediate backplane bus 232 is a high-speed bus. Intermediate backplane bus 232 is coupled to each transducer monitoring module 142 and to system monitoring module 144 such that each transducer monitoring module 142 and system monitoring module 144 may transmit and/or receive data and/or control signals from any other transducer monitoring module 142 and/or system monitoring module 144 through intermediate backplane bus 232. In one embodiment, intermediate backplane bus 232 includes, for example, a status bus 234 for use in transmitting status signals representative of a status of one or more components of monitoring system 100, a control bus 235 for use in transmitting relay control signals, a high-speed parallel monitor data bus 236 for use in transmitting data signals representative of transducer measurements, a high speed monitor network bus 238 for transmitting status and/or data signals representative of processed transducer measurements, and/or a configuration bus 240 for transmitting configuration data. Alternatively, intermediate backplane bus 232 includes any number of and/or type of suitable bus or busses that enables intermediate backplane 126 and/or monitoring system 100 to function as described herein.

In the exemplary embodiment, intermediate housing 132 substantially prevents electromagnetic radiation generated by intermediate backplane bus 232 from escaping into the environment. Intermediate backplane bus 232 facilitates providing a controlled impedance to high-speed signals transmitted and received within intermediate backplane bus 232. For example, in the exemplary embodiment, intermediate backplane 126 is constructed using multiple board layers that are selected and oriented to facilitate controlling the impedance and electromagnetic radiation of high-speed signals within intermediate backplane bus 232. As such, intermediate backplane 126 and monitoring system 100 facilitate providing a suitably shielded electrical system for high-speed signals to be transmitted and received between transducer monitoring modules 142 and/or system monitoring module 144.

During operation, power supply 106 provides power to supply module 204 through power input bus 203. Power supply 106 also transmits and receives one or more control and/or data signals to and from system monitoring module 144 through system interface bus 212. Power supply module 204 provides a plurality of power rails to intermediate backplane 126 and system backplane 104. Transducers 102 measure one or more operating conditions of one or more machines, and transmit transducer signals to signal input modules 210. Signal input modules 210 receive the transducer signals and transmit the transducer signals to transducer monitoring modules 142 through monitor interface busses 224, such as through transducer signal bus 228 of one or more monitor interface busses 224. Transducer monitoring modules 142 process and/or analyze the transducer signals, and transmit data relating to the transducer signals to other transducer monitoring modules 142 through intermediate backplane bus 232. Transducer monitoring modules 142 also transmit one or more status signals, alarm signals, and/or other suitable control and/or data signals to other transducer monitoring modules 142 and/or to system monitoring module 144 through intermediate backplane bus 232. Intermediate housing 132 reduces an amount of electromagnetic radiation that escapes to the environment from high-speed signals within intermediate backplane bus 232. In one embodiment, one or more electromagnetic interference gaskets 242 are positioned between intermediate housing 132 and interface boards 116 to isolate intermediate housing 132 from interface boards 116. As such, intermediate backplane 126, interface boards 116, and intermediate housing 132 enable system backplane 104 to be used with high-speed transducer monitoring modules 142.

Existing and/or legacy monitoring systems may be upgraded and/or retrofitted with one or more components of monitoring system 100. More specifically, existing and/or legacy monitoring systems may be retrofitted by coupling intermediate backplane 126, system interface board, and/or one or more monitor interface boards 120 between a system backplane and one or more transducer monitoring modules. As such, a legacy system backplane may be retrofitted to enable the backplane to be used with newer, high speed transducer monitoring modules. As used herein, the term "legacy" refers to components and/or systems that are incapable of and/or unsuitable for transmitting and/or receiving high speed signals.

The above-described embodiments provide an efficient and cost-effective intermediate backplane for a monitoring system. The intermediate backplane and the interface boards enable high speed transducer monitoring modules to be coupled to, and used with, a legacy system backplane that does not natively support high speed signaling required by the high speed transducer monitoring modules. Moreover, the intermediate housing and intermediate backplane facilitate reducing and/or containing electromagnetic radiation generated by one or more high speed signals that may otherwise escape into an external environment. As such, the monitoring system components described herein facilitate extending a usable life for legacy system backplanes.

Exemplary embodiments of monitoring systems and a backplane for a monitoring system are described above in detail. The systems and backplane are not limited to the specific embodiments described herein, but rather, components of the monitoring systems and/or the backplane may be utilized independently and separately from other components and/or steps described herein. For example, the backplane may also be used in combination with other monitoring systems and methods, and is not limited to practice with only the monitoring systems as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system comprising:
   at least one transducer configured to monitor an operating condition of at least one machine;
   a first backplane configured to be coupled to said at least one transducer;
   a second backplane configured to be coupled to said first backplane;
   at least one transducer monitoring module configured to be coupled to said second backplane, said at least one transducer monitoring module further configured to process at least one signal received from said at least one transducer; and
   a power supply module configured to couple to said second backplane, wherein said second backplane further comprises a power input bus configured to couple to said power supply module and to said first backplane, said power supply module further configured to provide power to said at least one transducer and to said at least one transducer monitoring module.

2. A monitoring system in accordance with claim 1, further comprising a system monitoring module configured to be coupled to said second backplane.

3. A monitoring system in accordance with claim 1, further comprising a housing, wherein said first backplane is positioned at least partially within said housing.

4. A monitoring system in accordance with claim 1, further comprising an electromagnetically shielded housing, wherein said second backplane is positioned within said electromagnetically shielded housing.

5. A monitoring system in accordance with claim 1, further comprising at least one interface board, said at least one interface board configured to be coupled to said second backplane and said first backplane.

6. A monitoring system in accordance with claim 1 wherein said second backplane further comprises a system backplane power bus configured to be coupled to said power supply module and said first backplane.

7. A monitoring system in accordance with claim 1, wherein said second backplane further comprises an intermediate backplane power bus configured to be coupled to said power supply module.

8. A monitoring system in accordance with claim 1, wherein said second backplane comprises a monitor interface bus configured to be coupled to said at least one transducer monitoring module and said first backplane.

9. A monitoring system in accordance with claim 1, further comprising:
   a system monitoring module configured to be coupled to said second backplane; and
   an intermediate backplane bus configured to be coupled to said system monitoring module and said at least one transducer monitoring module.

10. A monitoring system in accordance with claim 2, wherein said second backplane further comprises a system interface bus configured to be coupled to said system monitoring module and said first backplane.

11. A monitoring system comprising:
    at least one transducer configured to monitor an operating condition of at least one machine;
    a first backplane;
    a second backplane configured to couple to said first backplane, said second backplane comprising a system interface, at least one monitor interface, and an intermediate backplane bus; and
    a power supply module configured to couple to said second backplane, wherein said second backplane further comprises a power input bus configured to couple to said power supply module, said power supply module further configured to provide power to said at least one transducer.

12. A monitoring system in accordance with claim 11, further comprising at least one transducer monitoring module configured to couple to said second backplane.

13. A monitoring system in accordance with claim 11, further comprising at least one interface board configured to couple to said second backplane and said first backplane.

14. A monitoring system in accordance with claim 13, wherein said at least one interface board comprises:
    a system interface board configured to couple to said system interface bus; and
    at least one monitor interface board configured to couple to said at least one monitor interface bus.

15. A monitoring system in accordance with claim 14, wherein said at least one monitor interface bus comprises at least two monitor interface busses configured to couple to at least two transducer monitoring modules and said first backplane, said at least one monitor interface board configured to couple to said at least two monitor interface busses.

* * * * *